(12) United States Patent
Li et al.

(10) Patent No.: US 10,680,736 B2
(45) Date of Patent: Jun. 9, 2020

(54) FOUR-CHANNEL COARSE WAVELENGTH DIVISION MULTIPLEXING QSFP OPTICAL MODULE

(71) Applicant: LINKTEL TECHNOLOGIES CO., LTD., Wuhan, Hubei (CN)

(72) Inventors: Linke Li, Hubei (CN); Jian Zhang, Hubei (CN); Xianwen Yang, Hubei (CN); Tianshu Wu, Hubei (CN)

(73) Assignee: LINKTEL TECHNOLOGIES CO., LTD., Wuhan, Hubei (CN)

( * ) Notice: Subject to any disclaimer, the term of this patent is extended or adjusted under 35 U.S.C. 154(b) by 0 days.

(21) Appl. No.: 16/468,910

(22) PCT Filed: Jun. 15, 2018

(86) PCT No.: PCT/CN2018/091457
§ 371 (c)(1),
(2) Date: Jun. 12, 2019

(87) PCT Pub. No.: WO2019/052242
PCT Pub. Date: Mar. 21, 2019

(65) Prior Publication Data
US 2019/0334648 A1 Oct. 31, 2019

(30) Foreign Application Priority Data
Sep. 15, 2017 (CN) .......................... 2017 1 0833529

(51) Int. Cl.
*H04J 14/02* (2006.01)
*G02B 6/42* (2006.01)
(Continued)

(52) U.S. Cl.
CPC .............. *H04J 14/02* (2013.01); *G02B 6/428* (2013.01); *G02B 6/4215* (2013.01); *G02B 6/43* (2013.01); *H04B 10/40* (2013.01)

(58) Field of Classification Search
CPC ....... H04J 14/02; G02B 6/4215; G02B 6/428; G02B 6/43; G02B 6/4246; G02B 6/421;
(Continued)

(56) References Cited

U.S. PATENT DOCUMENTS 5,231,687 A * 7/1993 Handley .............. G02B 6/4471
385/139
7,637,672 B1 * 12/2009 Li ........................ G02B 6/4201
385/92
(Continued)

FOREIGN PATENT DOCUMENTS

CN 202904072 U 4/2013
CN 203773102 U 8/2014
(Continued)

*Primary Examiner* — Dibson J Sanchez
(74) *Attorney, Agent, or Firm* — Muncy, Geissler, Olds & Lowe, P.C.

(57) ABSTRACT

The invention relates to the field of optical communication network modules, and provides a 4-channel CWDM QSFP optical module, comprising a QSFP base and four optical transmitting sub-devices. The four optical transmitting sub-devices are mounted on the base in parallel, and there is a gap between each of the optical transmitting sub-devices and the base. The QSFP optical module further includes CWDM optical components for multiplexing 4-channel optical signals emitted by the four optical transmitting sub-devices. The CWDM optical components comprise a single fiber pigtail for transmitting the multiplexed optical signal, the single fiber pigtail being at least partially located in the gap. The 4-channel CWDM QSFP optical module of the invention connects the four optical transmitting sub-devices with the CWDM optical components by a reasonable method of optical fiber winding, thereby solves the problem that it is difficult to achieve single-mode fiber coupling of four LDs in a small space.

6 Claims, 1 Drawing Sheet

(51) Int. Cl.
*G02B 6/43* (2006.01)
*H04B 10/40* (2013.01)

(58) Field of Classification Search
CPC .. G02B 6/4292; G02B 6/4284; G02B 6/4263; G02B 6/4251; H04B 10/40
USPC .................................... 398/43–103, 182–201
See application file for complete search history.

(56) References Cited

U.S. PATENT DOCUMENTS

| | | | | |
|---|---|---|---|---|
| 8,712,206 | B2* | 4/2014 | Cooke | G02B 6/4452 385/135 |
| 9,273,951 | B2* | 3/2016 | Troxler | G01B 11/24 |
| 9,279,951 | B2* | 3/2016 | McGranahan | G02B 6/4452 |
| 9,529,172 | B2* | 12/2016 | Baker | G02B 6/28 |
| 9,553,671 | B1 | 1/2017 | Nagarajan et al. | |
| 10,295,763 | B2* | 5/2019 | Ho | G02B 6/4246 |
| 10,444,452 | B2* | 10/2019 | Noguchi | G02B 6/4281 |
| 2005/0084269 | A1* | 4/2005 | Dallesasse | G02B 6/4201 398/135 |
| 2006/0165366 | A1* | 7/2006 | Feustel | G02B 6/2804 385/135 |
| 2008/0089697 | A1* | 4/2008 | Shen | H04B 10/0799 398/183 |
| 2010/0067854 | A1* | 3/2010 | Oki | H01R 13/748 385/92 |
| 2010/0086307 | A1* | 4/2010 | Mitchell | H04J 14/02 398/79 |
| 2011/0058771 | A1* | 3/2011 | Lee | G02B 6/4215 385/33 |
| 2013/0115803 | A1* | 5/2013 | Tang | H04Q 1/136 439/488 |
| 2013/0272348 | A1* | 10/2013 | Lai | H04B 3/00 375/219 |
| 2015/0256259 | A1* | 9/2015 | Huang | G01J 1/0271 398/88 |
| 2015/0256261 | A1* | 9/2015 | Ho | G02B 6/43 398/139 |
| 2017/0059394 | A1* | 3/2017 | Ho | G01J 1/0271 |
| 2017/0168252 | A1* | 6/2017 | Pezeshki | G02B 6/4246 |
| 2017/0187462 | A1* | 6/2017 | Luo | G02B 6/4206 |
| 2017/0269311 | A1* | 9/2017 | Wang | G02B 6/4204 |
| 2017/0269315 | A1* | 9/2017 | Yeh | G02B 6/421 |
| 2017/0272169 | A1* | 9/2017 | Ho | H04B 10/40 |
| 2018/0052284 | A1* | 2/2018 | Matres | G02B 1/11 |
| 2018/0062756 | A1* | 3/2018 | Ho | H04B 10/572 |
| 2018/0172928 | A1* | 6/2018 | Ho | G02B 6/4246 |
| 2019/0018206 | A1* | 1/2019 | Luo | H04B 10/40 |
| 2019/0204510 | A1* | 7/2019 | Li | G02B 6/2938 |

FOREIGN PATENT DOCUMENTS

| | | |
|---|---|---|
| CN | 104870069 A | 8/2015 |
| CN | 107479150 A | 12/2017 |

\* cited by examiner

FOUR-CHANNEL COARSE WAVELENGTH DIVISION MULTIPLEXING QSFP OPTICAL MODULE

CROSS-REFERENCE TO RELATED APPLICATIONS

This application claims priority to International Application No. PCT/CN2018/091457, filed on Jun. 15, 2018, which claims the priority benefit of China Patent Application No. 201710833529.5, filed on Sep. 15, 2017. The contents of the above identified applications are incorporated herein by reference in their entirety.

FIELD OF THE TECHNOLOGY

The invention relates to the field of optical communication network module, in particular to a four-channel coarse wavelength division multiplexing QSFP optical module.

DESCRIPTION OF THE RELATED ART

QSFP (Quad Small Form-factor Pluggable) (QSFP+ QSFP28) is a main package form of 40 G/100 G optical modules. In its internal, 4*10 G/4*25 G parallel transmission is adopted for electrical transmission to achieve 40 G and 100 G transmission. The external optical interface can adopt 4 channels of optical fiber parallel MT interfaces or single optical fiber multiplexed LC interfaces. For the single-fiber multiplexed mode, the CWDM (coarse wavelength division multiplexing) using CWDM wavelength is more widely used due to its economy.

Due to the implementation of multiplexing and demultiplexing of 4 wavelengths inside the module, at present, the traditional packaging technology integrates 4 LDs and 4 PDs into TOSA and ROSA respectively in an integrated manner, and then connects to the PCB through FPC. In this technical solution, the size of the TOSA package is usually designed to be 5.6~7 mm wide. Due to the single-mode fiber coupling of four LDs in such a small TOSA package, the design and process are difficult to implement, and the manufacturing efficiency is low, resulting in high manufacturing cost and low output. Since each LD chip and its optical path are integrated, failure of any one channel will causes failure of the entire device, so the yield is low, which further leads to an increase in cost.

Therefore, it is urgent to provide a QSFP optical module structure that is easy to be implemented in the process to solve the above TOSA coupling problem.

SUMMARY OF THE INVENTION

The purpose of the present invention is to provide a four-channel CWDM (Coarse Wavelength Division Multiplexing) QSFP (Quad Small Form-factor Pluggable) optical module, which is used to connect four optical transmitting sub-devices with CWDM optical components with a reasonable fiber winding method, thereby solving the difficulty of coupling of 4 LDs' single-mode optical fibers in a narrow space.

To achieve the above purpose, the embodiment of the invention provides the following technical solutions:

A four-channel CWDM QSFP optical module, comprising a QSFP base and four optical transmitting sub-devices, wherein: the four optical transmitting sub-devices are mounted on the base in parallel, and there is a gap between each optical transmitting sub-device and the base; the QSFP optical module further includes a CWDM optical components for multiplexing 4-channel optical signals emitted by the four optical transmitting sub-devices, the CWDM optical components comprising a single fiber pigtail for transmitting the multiplexed optical signal, the single fiber pigtail being at least partially located in the gap.

Further, the four-channel CWDM QSFP optical module includes CWDM optical receiving components for receiving the multiplexed optical signal, and the coarse wavelength division multiplexed optical receiving components includes a demultiplexer, four optical receiving PDs and a housing mounted on the base adjacent to the four optical transmitting sub-devices, the demultiplexer and the four optical receiving PDs are integrated in the housing.

Further, the CWDM optical components further includes an array fiber and an arrayed waveguide grating, the arrayed waveguide grating is connected with the array of optical fibers, and both are located on one side of the housing, and the array fiber has 4 channels; the 4 optical transmitting sub-devices are located in the middle of the base along the arrangement direction from optical transmitting sub-devices to the arrayed waveguide grating.

Further, an LC adapter is mounted on the side of the housing far from the transmitting optical sub-device, and one end of the single fiber pigtail is connected with the arrayed waveguide grating, and the other end of the single fiber pigtail is connected with the LC adapter.

Further, the single fiber pigtail includes a first arc segment, a first straight segment, a second arc segment, and a second straight segment that are connected in turn, the housing and the first straight segment are connected by the first arc segment, the second arc segment partially surrounds the housing and is placed in the gap, the second straight segment is on the same side as the housing and is connected with the LC adapter.

Further, the first straight segment and the arrayed waveguide grating are respectively located on opposite sides of the housing, and the first straight segment extends along one side of the housing.

Further, four optical fiber ferrules are disposed between the housing and the four optical transmitting sub-devices, the four optical transmitting sub-devices have LC-type socket, the four fiber ferrules correspond one to one with the four LC type sockets respectively, any of the fiber ferrules is disposed on the corresponding LC type socket, and an optical signal emitted by each optical transmitting sub-device is transmitted to the CWDM optical components through corresponding optical fiber ferrule.

Further, the four optical fibers are at least partially located directly below the array fiber and the arrayed waveguide grating.

Further, a first rigid circuit board is disposed on the base, the first rigid circuit board is electrically connected with the first flexible circuit board, and the first flexible circuit board is electrically connected with the CWDM optical receiving components; a second flexible circuit board is electrically connected with the first rigid circuit board on the position near the four optical transmitting sub-devices, and the four optical transmitting sub-devices are electrically connected with the second flexible circuit board.

Further, a second rigid circuit board is disposed between the first rigid circuit board and the base, and the second rigid circuit board is connected with the first rigid circuit board by a third flexible circuit board.

Compared with the prior art, the present invention has the following beneficial effects:

A four-channel CWDM QSFP optical module, which generates optical signals by using four independent optical transmitting sub-devices to avoid integration of optical paths and failure of any channel that may cause failure of the entire optical module, and improve the yield, and the four independent optical transmitting sub-devices are all implemented by standard coaxial process, the process is mature and the yield is high, which effectively solves the problem of difficulty of single-mode fiber coupling caused by the integrated mode. A demultiplexer with lower loss than array waveguide grating is used in the CWDM optical receiving components, which improves the sensitivity of the receiving end and makes the process easier to be implemented.

DESCRIPTION OF REFERENCE NUMERALS

1—optical transmitting sub-device, 2—base, 3—gap, 4—CWDM optical components, 40—single fiber pigtail, 41—arrayed waveguide grating, 42—array fiber, 5—CWDM optical receiving components, 50—housing, 6—LC adapter, 70—first arc segment, 71—first straight segment, 72—second arc segment, 73—second straight segment, 8—optical fiber, 80—optical fiber ferrule, 81—LC type socket, 90—first rigid board, 91—first flexible circuit board, 92—second flexible circuit board, 94—second rigid board, 95—third flexible circuit board.

DESCRIPTION OF EMBODIMENTS

The technical solutions in the embodiments of the present invention are clearly and completely described in the following with reference to the accompanying drawings in the embodiments of the present invention. It is apparent that the described embodiments are only a part of the embodiments of the invention, but not all of the embodiments. All other embodiments obtained by those of ordinary skill in the art based on the embodiments of the present invention without creative efforts are within the scope of the present invention.

Figure 1:
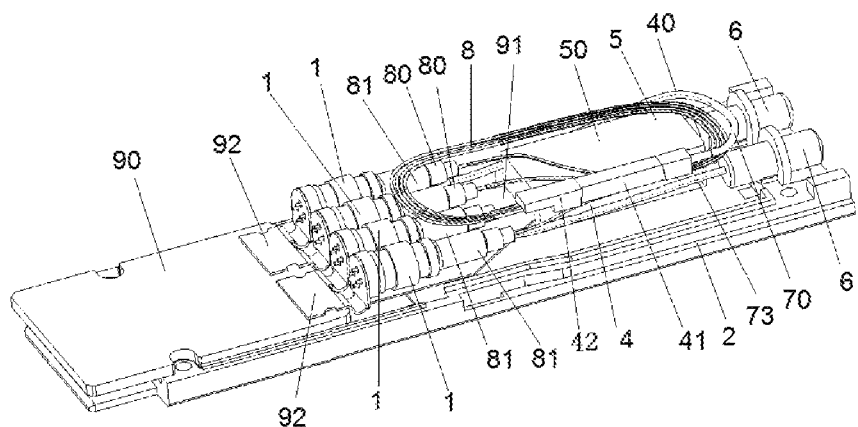
FIG. 1 is a schematic structural diagram of a four-channel CWDM QSFP optical module according to the embodiment of the present invention.
Figure 2:
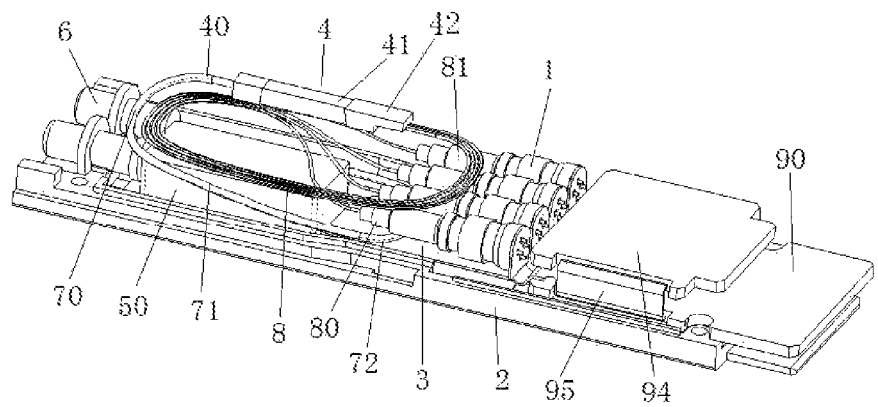
FIG. 2 is a schematic structural diagram of a four-channel CWDM QSFP optical module installed with a second rigid circuit board according to the embodiment of the present invention.

Referring to FIG. 1 and FIG. 2, an embodiment of the present invention provides a four-channel CWDM (coarse wavelength division multiplexing) QSFP (Quad Small Form-factor Pluggable) optical module, which includes a QSFP base 2 and four optical transmitting sub-devices 1. The four optical transmitting sub-devices are mounted on the base 2 in parallel, and there is a gap 3 between each optical transmitting sub-device 1 and the base 2. The model of the four optical transmitting sub-devices 1 can be T038, and its single-channel rate can reach 25 GB/s. The QSFP optical module further includes a CWDM optical components 4 for multiplexing 4-channel optical signals emitted by the four optical transmitting sub-devices 1. The coarse wavelength division multiplexed optical components 4 comprise a single fiber pigtail 40 for transmitting the multiplexed optical signal. The single fiber pigtail 40 is at least partially located in the gap. Using four independent optical transmitting sub-devices 1 to generate optical signals avoids integration of the light paths, and failure of any channel which will result in failure of the entire optical module, and increases yield. The existing QSFP base 2 is standard. When four optical transmitting sub-devices 1, CWDM optical components 4, and CWDM optical receiving components 5 are disposed in a limited space of QSFP base 2. The space for the single fiber pigtail 40 is compressed to a minimum, in order to ensure the winding radius of the single fiber pigtail 40. The winding method adopted in this embodiment can solve the technical problem, that is, a portion of the single fiber pigtail 40 passes between the optical transmitting sub-devices 1 and the base 2. This design can also avoid interference with the four optical transmitting sub-devices 1, and the four optical transmitting sub-devices 1 can also limit the single-fiber pigtail 40, preventing it from lifting and constraining the single fiber pigtail 40.

Further optimizing the above scheme, the QSFP optical module further includes a CWDM optical receiving components 5 for receiving multiplexed optical signals. The CWDM optical receiving components 5 includes a demultiplexer, four optical receiving PDs, and a housing 50 mounted on the base 2 near the four optical transmitting sub-devices 1. The demultiplexer the four optical receiving PDs are integrated in the housing 50. The purpose of the CWDM optical receiving components 5 is to receive optical signals from other optical modules, and then demultiplex the multiplexed optical signals by using a demultiplexer. The housing 50 is mounted on the base 2, which is located on the right side of the four optical transmitting sub-devices 1 in FIG. 1. The demultiplexer and the four optical receiving PDs are integrated in the housing 50. The receiving end adopting an integrated method improves the sensitivity of the receiving end, thereby improves the yield and production efficiency. The CWDM optical receiving components 5 is connected with the LC adapter 6 for easy to connect with other optical modules.

Further optimizing the above scheme, the CWDM optical components 4 further includes an array fiber 42 and an arrayed waveguide grating 41. The arrayed waveguide grating 41 is connected with the array fibers 42, and both are located on one side of the housing 50, and the array fiber has 4 channels. The arrayed waveguide grating 41 is strip-shaped to reduce the space occupied. The 4 optical transmitting sub-devices are located in the middle of the base along the arrangement direction from the optical transmitting sub-device to the arrayed waveguide grating, which overcomes the technical problems in the prior art that the front space is too narrow to let them line up. The array fiber 42 has four channels. In practice, they can simultaneously receive the optical signal emitted by the transmitting end, and multiplex the optical signals into one optical signal through the arrayed waveguide grating.

Further optimizing the above scheme and referring to FIG. 1 and FIG. 2, an LC adapter 6 is mounted on the side of the housing 50 far from the optical transmitting sub-device 1, and one end of the single fiber pigtail 40 is connected with the arrayed waveguide grating 41, and the other end of the single fiber pigtail 40 is connected with the LC adapter 6.

Further optimizing the above scheme and referring to FIG. 1 and FIG. 2, it is difficult to achieve coupling of four LD single-mode fibers in a small space and a reasonable fiber winding method is needed to solve the problem. The single fiber pigtail 40 includes a first arc segment 70, a first straight segment 71, a second arc segment 72, and a second straight segment 73 that are connected in turn. The housing 50 and the first straight segment 71 are connected by the first arc segment 70. The second arc segment 72 partially surrounds the housing 50 and is placed in the gap 3. The second straight segment 73 is on the same side as the housing 50 and is connected with the LC adapter 6. The second arc segment 72 can also be a straight segment or other shape, as long as it is within the gap 3. Using the winding method described above can ensure the winding radius of the single fiber pigtail 40 in a limited space, and also can prevent the single fiber pigtail 40 from interfering with the four optical transmitting sub-devices 1, and solves the problem that it is difficult to achieve coupling of 4 LD single-mode fibers in a small space. The four optical transmitting sub-devices 1 can also limit the single-fiber pigtail 40 to prevent it from lifting up, thereby constraining the single-fiber pigtail 40.

Further optimizing the above scheme, the first straight segment 71 and the arrayed waveguide grating 41 are respectively located on opposite sides of the housing 50. The first straight segment 71 extends along one side of the housing 50. The second straight segment 73 can also extend along one side of the housing 50.

As an optimized scheme of this embodiment, four optical fiber ferrules 80 are disposed between the housing 50 and the four optical transmitting sub-devices 1. The four optical transmitting sub-devices 1 have LC-type socket 81. The four fiber ferrules 80 correspond one to one with the four LC type sockets 81 respectively. Each of the fiber ferrules 80 is disposed on the corresponding LC type socket 81. An optical signal emitted by each of the optical transmitting sub-devices 1 is transmitted to the CWDM optical components 4 through corresponding optical fiber ferrule 80. The four fiber ferrules 80 are all fiber-optic ceramic ferrules, and the four LC-type sockets 81 are all LC-type ceramic sockets, which makes it possible to flexibly replace any component loss during manufacturing and greatly improves the yield of the product.

Further optimizing the above scheme and referring to FIG. 1 and FIG. 2, four optical fibers 8 are at least partially located directly below the array fiber 42 and the arrayed waveguide grating 41. The CWDM optical components 4 is strip-shaped. As shown in FIG. 2, the CWDM optical components 4 is located on the left side of the transmitting optical sub-device 1 and is higher than both the optical transmitting sub-device 1 and the CWDM optical receiving components 5. The four optical fibers 8 have a winding shape similar to an elliptical shape. After extending from the optical fiber ferrule 80, they extend first directly below the array optical fiber 42 and the arrayed waveguide grating 41, and then wrap around in an elliptical manner to connect to the array optical fiber 42. Each of the optical fibers 8 is always located above each of the optical transmitting sub-devices 1 and the housing 50 to avoid interference with the single-fiber pigtail 40 passing under the transmitting optical sub-device 1. Each of the optical fibers 8 is at least partially located directly below the array fiber 42 and the arrayed waveguide grating 41, and can be constrained by the arrayed waveguide grating 41 and the arrayed optical fibers 42 in alignment. Since the height of the housing 50 is slightly lower than any of the optical transmitting sub-devices 1, it is ensured that the four optical fibers 8 can be flattened after winding. The four fibers 8 can be constrained by bandage binding to avoid from spreading.

As an optimized scheme of this embodiment and referring to FIG. 1 and FIG. 2, a first rigid circuit board 90 is disposed on the base 2. The first rigid circuit board 90 is electrically connected with a first flexible circuit board 91. The first flexible circuit board 91 is electrically connected with the CWDM optical receiving components 5. A second flexible circuit board 92 is electrically connected with the first rigid circuit board 90 on the position near the four optical transmitting sub-devices 1. The four optical transmitting sub-devices 1 are electrically connected with the second flexible circuit board 92. The purpose of the first flexible circuit board 91 is to use for high-speed electrical connection between the coarse wavelength division multiplexed optical receiving components 5 and the first rigid circuit board 90. There are two of the second flexible circuit board 92. One of the second flexible circuit board 92 is electrically connected with the two optical transmitting sub-devices 1 near the inside of the paper in the drawing and then realizes high-speed electrical connection with the first rigid circuit board 90. Similarly, the other two optical transmitting sub-devices 1 are electrically connected with the first rigid circuit board 90 at high-speed through the other second flexible circuit board 92, and finally realizes that the electrical components are electrically connected with the two components.

Further optimizing the above scheme and referring to FIG. 2, a second rigid circuit board 94 is disposed between the first rigid circuit board 90 and the base 2. The second rigid circuit board 94 is connected with the first rigid circuit board 90 by a third flexible circuit board 95. With this configuration, it is possible to increase mounting position for other electrical components, and skillfully utilize the space in the vertical direction, thereby facilitating the installation of more electrical components. If there are not so many components, it is not necessary to install the second rigid board 94.

Although the embodiments of the present invention have been shown and described, it will be understood by those skilled in the art that various changes, modifications, substitutions and variations can be made to the embodiments without departing from the spirit and scope of the invention. The scope of the invention is defined by the appended claims and their equivalents.

What is claimed is:

1. A four-channel CWDM (coarse wavelength division multiplexing) QSFP (Quad Small Form-factor Pluggable) optical module, comprising a QSFP base and four optical transmitting sub-devices, Wherein the four optical transmitting sub-devices are mounted on the base in parallel, and there is a gap between each optical transmitting sub-device and the base;

the QSFP optical module further comprises a CWDM optical components for multiplexing 4-channel optical signals emitted by the four optical transmitting sub-devices;

the CWDM optical components comprise a single fiber pigtail for transmitting the multiplexed optical signal; the single fiber pigtail is at least partially located in the gap;

the QSFP optical module further comprises CWDM optical receiving components for receiving the multiplexed optical signal;

a coarse wavelength division multiplexed optical receiving components comprises a demultiplexer, four optical receiving PDs and a housing mounted on the base adjacent to the four optical transmitting sub-devices;

the demultiplexer and the four optical receiving PDs are integrated in the housing;

the CWDM optical components further comprises an array fiber and an arrayed waveguide grating;

the arrayed waveguide grating is connected with the array fiber, and both are located on one side of the housing;

the array fiber has 4 channels;

the four optical transmitting sub-devices are located in the middle of the base along an arrangement direction from the optical transmitting sub-devices to the arrayed waveguide grating;

an LC adapter is mounted on a side of the housing far from the optical transmitting sub-devices;

one end of the single fiber pigtail is connected with the arrayed waveguide grating, and an other end of the single fiber pigtail is connected with the LC adapter;

the single fiber pigtail comprises a first arc segment, a first straight segment, a second arc segment, and a second straight segment that are connected in turn;

the arrayed waveguide grating and the first straight segment are connected by the first arc segment;

the second arc segment partially surrounds the housing and is placed in the gap;

the first straight segment and the arrayed waveguide grating are respectively located at opposite sides of the housing;

the second straight segment and the arrayed waveguide grating are located on a same side as the housing, and the second straight segment is connected with the LC adapter.

2. The four-channel CWDM QSFP optical module as claimed in claim 1, wherein the first straight segment extends along one side of the housing.

3. The four-channel CWDM QSFP optical module as claimed in claim 1, wherein four optical fiber ferrules are disposed between the housing and the four optical transmitting sub-devices;

each of the four optical transmitting sub-devices has an LC-type socket;

the four fiber ferrules correspond one by one with the four LC type sockets respectively;

each of the fiber ferrules is disposed on the corresponding LC type socket;

an optical signal emitted by each optical transmitting sub-device is transmitted to the CWDM optical components through corresponding optical fiber ferrule.

4. The four-channel CWDM QSFP optical module as claimed in claim 3, wherein four optical fibers are at least partially located directly below the array fiber and the arrayed waveguide grating.

5. The four-channel CWDM QSFP optical module as claimed in claim 1, wherein: a first rigid circuit board is disposed on the base; the first rigid circuit board is electrically connected with a first flexible circuit board; the first flexible circuit board is electrically connected with the CWDM optical receiving components; a second flexible circuit board is electrically connected with the first rigid circuit board on the position near the four optical transmitting sub-devices; the four optical transmitting sub-devices are electrically connected with the second flexible circuit board.

6. The four-channel CWDM QSFP optical module as claimed in claim 5, wherein: a second rigid circuit board is disposed between the first rigid circuit board and the base; the second rigid circuit board is connected with the first rigid circuit board by a third flexible circuit board.

* * * * *